US011765637B2

(12) United States Patent
Pragada et al.

(10) Patent No.: US 11,765,637 B2
(45) Date of Patent: Sep. 19, 2023

(54) ASSURANCE DRIVEN MOBILITY MANAGEMENT

(71) Applicant: InterDigital Patent Holdings, Inc., Wilmington, DE (US)

(72) Inventors: Ravikumar V. Pragada, Warrington, PA (US); Anantharaman Balasubramanian, San Diego, CA (US); Tanbir Haque, Jackson Heights, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 141 days.

(21) Appl. No.: 16/482,887

(22) PCT Filed: Feb. 1, 2018

(86) PCT No.: PCT/US2018/016494
§ 371 (c)(1),
(2) Date: Aug. 1, 2019

(87) PCT Pub. No.: WO2018/144761
PCT Pub. Date: Aug. 9, 2018

(65) Prior Publication Data
US 2021/0297921 A1    Sep. 23, 2021

Related U.S. Application Data

(60) Provisional application No. 62/453,299, filed on Feb. 1, 2017.

(51) Int. Cl.
*H04W 36/32* (2009.01)
*H04W 36/00* (2009.01)
*H04W 72/51* (2023.01)

(52) U.S. Cl.
CPC ....... *H04W 36/32* (2013.01); *H04W 36/0072* (2013.01); *H04W 72/51* (2023.01)

(58) Field of Classification Search
None
See application file for complete search history.

(56) References Cited

U.S. PATENT DOCUMENTS 6,169,898 B1 * 1/2001 Hsu .................. H04W 28/24
                                                 455/433
10,520,597 B2 * 12/2019 Kalyandurg .......... G01S 13/933
(Continued)

FOREIGN PATENT DOCUMENTS

EP        2713644 A1    4/2014
WO    2005/027556 A1    3/2005
(Continued)

OTHER PUBLICATIONS

3rd Generation Partnership Project (3GPP), TR 36.881 V0.5.0, "Technical Specification Group Radio Access Network; Evolved Universal Terrestrial Radio Access (E-UTRA); Study on Latency Reduction Techniques for LTE (Release 13)", Nov. 2015, 86 pages.
(Continued)

*Primary Examiner* — Kodzovi Acolatse
(74) *Attorney, Agent, or Firm* — CONDO ROCCIA KOPTIW LLP

(57) ABSTRACT

Systems, methods, and instrumentalities are disclosed for a wireless transmit/receive unit (WTRU) configured to receive a configuration defining a dedicated radio resource assignment for a travel path, wherein the dedicated radio resource assignment comprises dedicated resources assigned to the WTRU in a plurality of cells and specifies a time interval when the resources will be dedicated to the WTRU in each of the plurality of cells; determine a first time has been reached and utilize dedicated resources in a first cell based on reaching the first time; and determine a second time
(Continued)

has been reached and utilize dedicated resources in a second cell based on reaching the second time.

16 Claims, 10 Drawing Sheets

(56) References Cited

U.S. PATENT DOCUMENTS

| | | | | |
|---|---|---|---|---|
| 2004/0192341 | A1* | 9/2004 | Wang | H04W 28/26 455/456.1 |
| 2007/0133438 | A1* | 6/2007 | Shaffer | H04L 12/1813 370/260 |
| 2009/0262699 | A1* | 10/2009 | Wengerter | H04L 5/0039 370/330 |
| 2012/0245834 | A1* | 9/2012 | Klooster | G08G 5/0039 701/120 |
| 2014/0357279 | A1* | 12/2014 | Lee | H04W 36/32 455/440 |
| 2015/0105116 | A1* | 4/2015 | Schmidt | H04W 16/14 455/509 |
| 2017/0215178 | A1* | 7/2017 | Kim | H04W 72/048 |
| 2018/0068567 | A1* | 3/2018 | Gong | B64C 39/024 |
| 2018/0074520 | A1* | 3/2018 | Liu | G08G 5/0052 |
| 2018/0160433 | A1* | 6/2018 | Kim | H04B 7/18504 |
| 2019/0069319 | A1* | 2/2019 | Arshad | H04W 72/1268 |
| 2019/0174149 | A1* | 6/2019 | Zhang | H04N 21/21805 |
| 2020/0068584 | A1* | 2/2020 | Matsuki | H04W 72/10 |

FOREIGN PATENT DOCUMENTS

| | | |
|---|---|---|
| WO | 2013/025539 A1 | 2/2013 |
| WO | 2016/119876 A1 | 8/2016 |

OTHER PUBLICATIONS

Kopardekar et al., "Unmanned Aircraft System Traffic Management (UTM) Concept of Operations", 16th AIAA Aviation Technology, Integration, and Operations Conference, Washington DC, USA, Jun. 13-17, 2016, pp. 1-16.
3rd Generation Partnership Project (3GPP), R2-154194, "Latency Reduction During Handover", Huawei, HiSilicon, TSG-RAN WG2 Meeting #91bis, Malmo, Sweden, Oct. 5-9, 2015, 05 pages.
3rd Generation Partnership Project (3GPP), R2-154259, "Latency Reduction During Handover", Nokia Networks, TSG-RAN WG2 Meeting #91, Beijing, China, Aug. 24-28, 2015, 7 pages.
3rd Generation Partnership Project (3GPP), TS 36.331 V14.1.0, "Technical Specification Group Radio Access Network; Evolved Universal Terrestrial Radio Access (E-UTRA); Radio Resource Control (RRC); Protocol Specification (Release 14)", Dec. 2016, pp. 1-654.

* cited by examiner

ASSURANCE DRIVEN MOBILITY MANAGEMENT

CROSS-REFERENCE TO RELATED APPLICATIONS

This application is the National Stage entry under 35 U.S.C. § 371 of Patent Cooperation Treaty Application PCT/US2018/016494, filed Feb. 1, 2018, which claims the benefit of U.S. Ser. No. 62/453,299 on Feb. 1, 2017, the entirety of which is incorporated herein as if reproduced in its entirety.

BACKGROUND

Drones are a deeply disruptive technology with massive implications across industries. Drone revolution may be poised to reshape economic, social, security, environmental, political and legal landscapes over the next twenty years. The civilian market may be growing faster than the military market. The global commercial drone market may be expanding in construction, agriculture, energy, utilities, insurance, mining, real estate, package delivery, news media, and film production. There may be a significant increase in drone technology investments. It has been predicted that drones will spawn a $90 billion (cumulative) industry within a decade. Other autonomous vehicles (e.g., self-driving cars and trucks, etc.) and communications needs (e.g., Vehicle-to-Everything (V2X)) are also on the rise.

SUMMARY

Systems, methods, and instrumentalities are disclosed for a wireless transmit/receive unit (WTRU) configured to receive a configuration defining a dedicated radio resource assignment for a travel path, wherein the dedicated radio resource assignment comprises dedicated resources assigned to the WTRU in a plurality of cells and specifies a time interval when the resources will be dedicated to the WTRU in each of the plurality of cells; determine a first time has been reached and utilize dedicated resources in a first cell based on reaching the first time; and determine a second time has been reached and utilize dedicated resources in a second cell based on reaching the second time.

BRIEF DESCRIPTION OF THE DRAWINGS

A more detailed understanding may be had from the following description, given by way of example in conjunction with the accompanying drawings.

DESCRIPTION

Figure 1A:
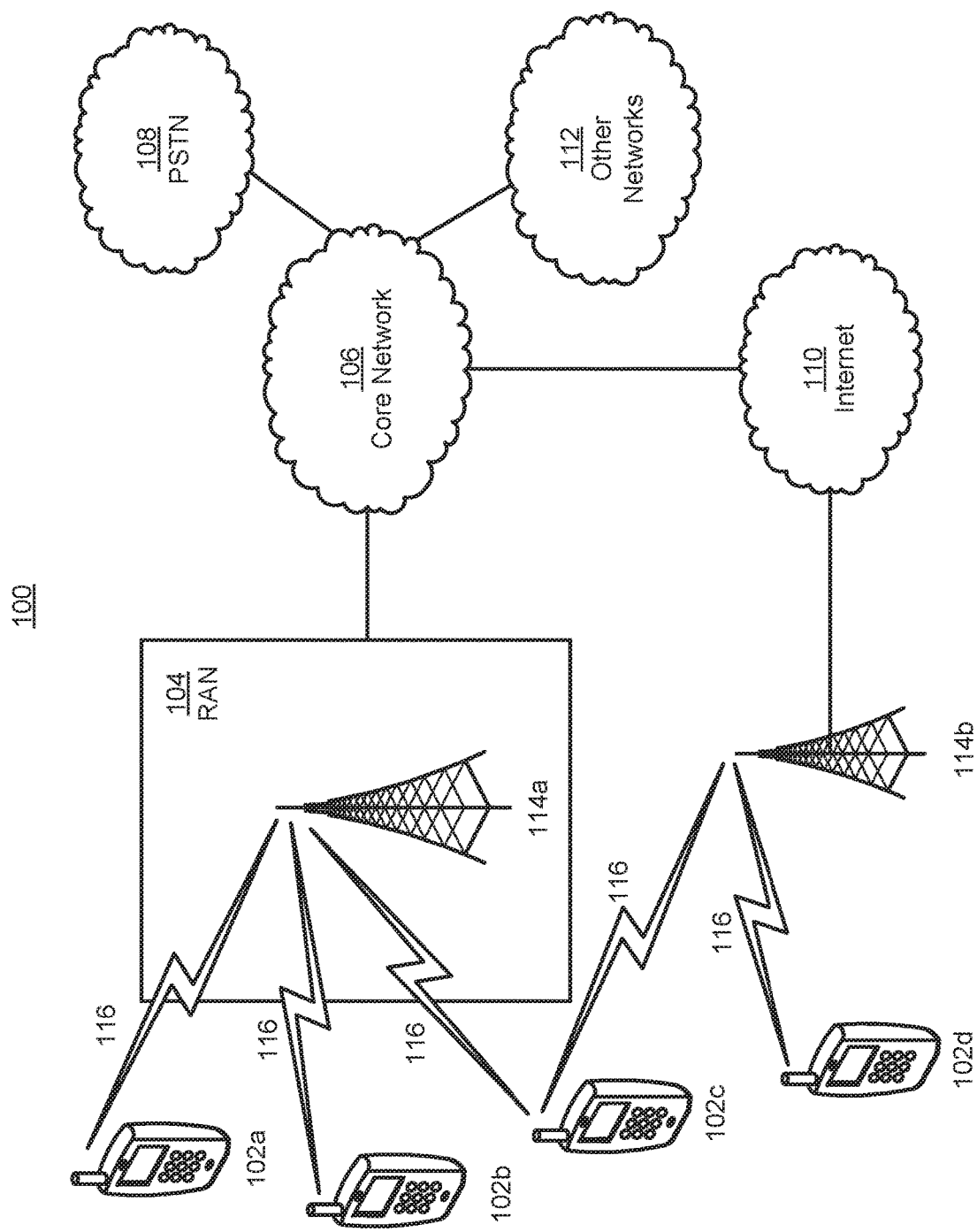
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IOT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
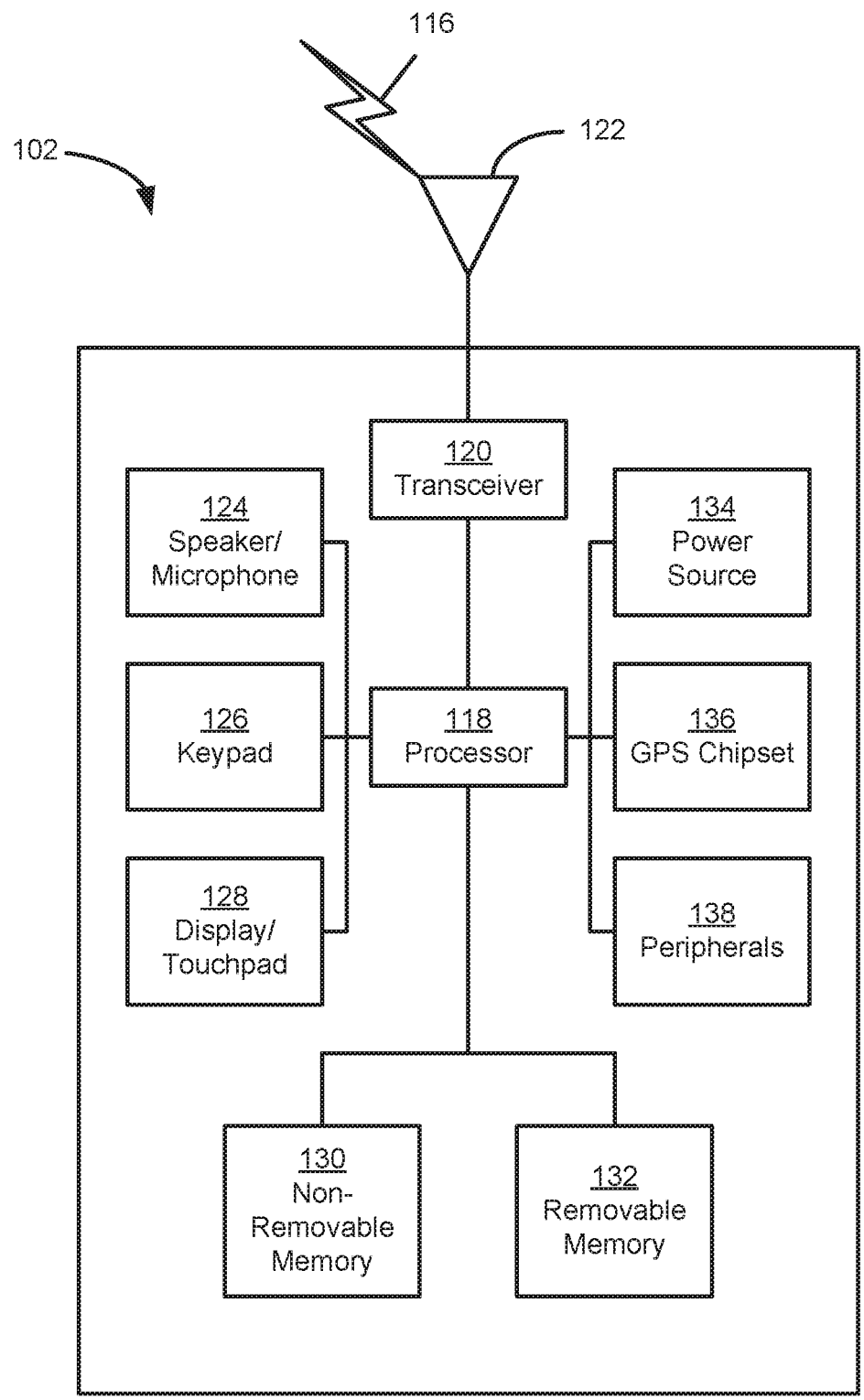
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
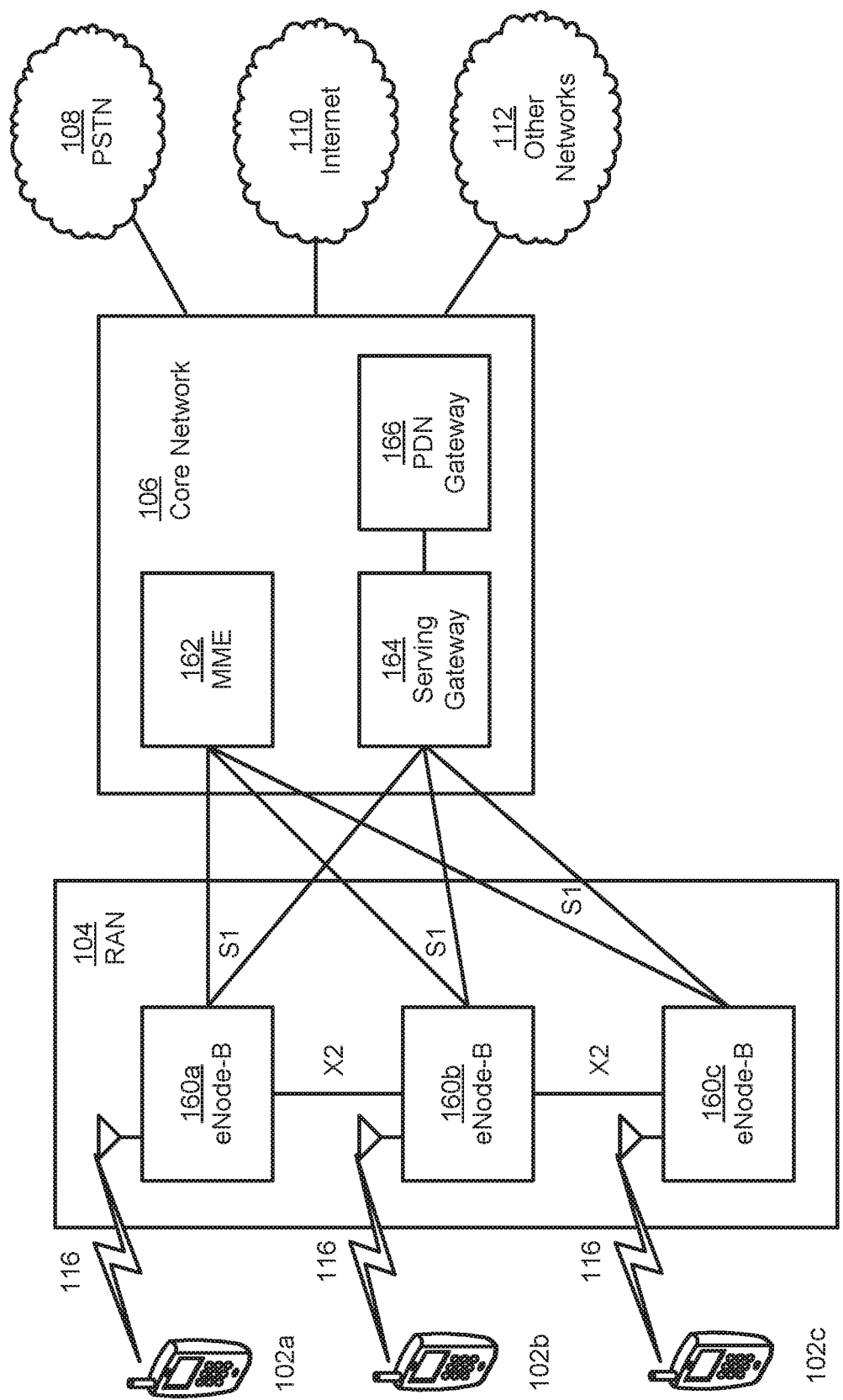
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU $102a_i$.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
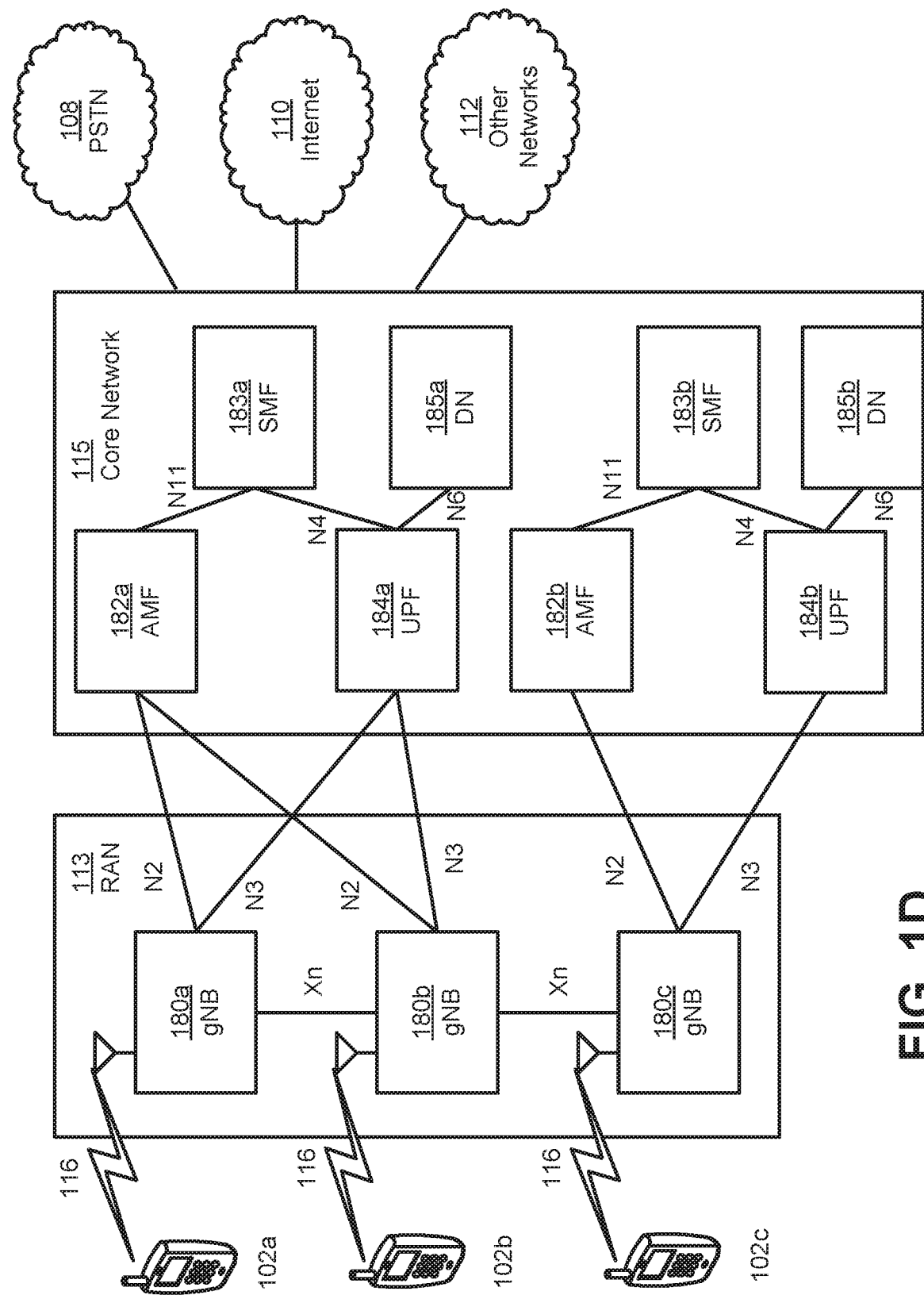
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b$_5$.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The following description includes radio resource allocation and mobility handling in the context of UAV and airspace management. However, it should be apparent that the following may be applied to any time-critical and/or data-sensitive applications regarding location and time (such as, for example, vehicles with a predetermined travel path). For example, autonomous vehicles (e.g., self-driving cars and trucks, etc.) and communications needs (e.g., Vehicle-to-Everything (V2X)) are contemplated. Thus, although specific examples and embodiments described herein may be described in terms of actions performed by a UAV, the examples and embodiments may be equally applicable to many other types of WTRUs. Thus, the examples described herein are not meant to be limited to UAVs.

Flight management for UAVs may be performed based on airspace resource availability, which may depend on dynamic geo-fencing, traffic scenarios, weather, etc. Flight management may be performed based on airspace and radio resource availability and requirements. Changes in radio resource availability may trigger changes in airspace resource availability and vice-versa, effecting the flight plan. The radio resource requirements and radio resources availability for the flight path may be taken into account for providing guaranteed radio resources for command and control links.

An unmanned aerial systems traffic management (UTM) may interact with the Evolved Packet Core (EPC) and/or Radio Access Network (RAN) to enable joint flight planning. Such interaction may allow for the coordination between allocation of flight paths in space and time as well as radio resources for the flight path to support UAV signaling (e.g., command and control signaling). Radio resources may be reallocated in the event of path change. Time-based block radio resource allocation may be performed for the flight mission. Time-based preconfigured low-latency/lossless handover between cells may be performed. For example, changes in UAV radio configuration and resource usage may be linked to or triggered by reaching certain time thresholds or points in time, for example corresponding to times when the UAV is expected to enter specified portions of its flight path.

For example, an unmanned aerial vehicle (UAV) may submit a flight plan request with its source and intended destination to the UTM. The UTM may provide a number of possible routes that may take into account the airspace constraints, time of operation, a quality of service (QoS) requirement, priority or criticality of the mission (e.g., emergency services etc.), and provide it to the UTM servicing center (UTM-SC) which may reside in the EPC. A radio resource request may be submitted (e.g., by the UTM-SC) based on the possible routes, time, and/or the QoS requirement. Radio resource availability information for the different routes may be received (e.g., by the UTM-SC from the EUTRAN). A route (e.g., best) may be determined (e.g., by the UTM and/or UTM-SC, or jointly) based on radio and airspace resources. Based on the determined route, radio resources and the route may be assigned to the UAV.

Figure 2:
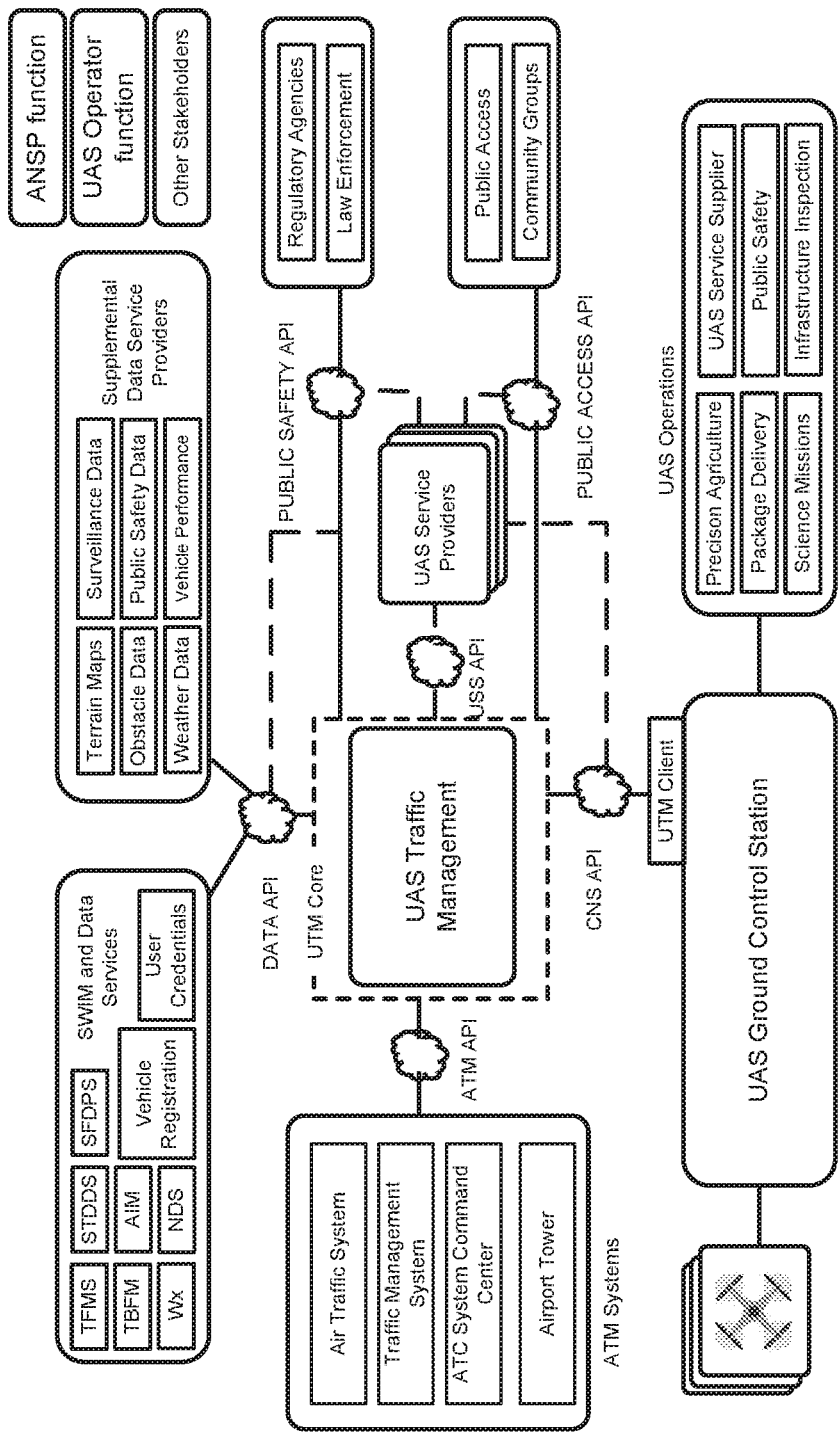
FIG. 2 is an example architecture for an Unmanned Aerial Systems (UAS) traffic management (UTM).

Applications for small Unmanned Aerial Systems (sUAS) may include package delivery, precision agriculture, pipeline inspection etc. References to sUAS and the techniques described herein may be applicable to systems, UAV devices, or both. sUAS operations may occur in the same airspace as the current manned airspace systems, however at altitudes less than 400 feet. sUAS operations for some applications may operate autonomously in beyond visual line of sight (BVLOS) scenarios. sUAS operations may respond to dynamically changing environment, traffic scenarios, contingency management, reliable data link connection between the ground control station and sUAS operations. Automatic dependent surveillance-Broadcast (ADS-B) systems may be used. Flight planning and air space resource reservation for manned systems may be semi-static for the duration of flight. FIG. 2 describes an example UAS traffic management (UTM) architecture.

Airspace resources may be managed by the UTM system and/or managed in coordination with radio communication infrastructure (e.g., RAN and EPC networks, 5G networks, etc.). For example, airspace can be considered as a resource much like spectrum. When several small UAS needs to use the limited airspace resource, a strategy may include maximizing the number of small UAS that may be supported, while maintaining acceptable levels of safety and reliability. Further, airspace may have static, semi-static and dynamically varying (e.g., created due to unforeseen traffic scenarios) geo-fencing constraints (e.g., no-fly zone), and airspace access priority (e.g., due to emergency vehicles accessing the airspace) making the availability of airspace non-deterministic. A UTM may provide reliability in these environments by providing updates in flight plan based on dynamic airspace constraints.

UTM-based flight path management may be provided. A UAV may provide its source and destination, and may request a flight plan from the UTM. Based on the current and/or anticipated traffic scenarios, the UTM may provide a flight plan that may contain the GPS way points and 4D-tube (e.g., 3D position information, time) allocations for the parts/phases of its flight path. Once the UAV traverses a 4D-tube, the air space resource may be released, and the UTM may allocate it to other UAVs that may request to use this 4D-tube.

When used herein, the term 4D-tube may be used to refer to a series of space and time waypoints corresponding to a flight path. For example, the 4D-tube may be comprised of a set of GPS coordinates and the times at which the UAV is expected to reach each coordinate when executing the flight path. Each segment of a flight path in the 4D tube may be associated with a starting coordinate and a starting time as well as an ending coordinate and an ending time. The ending coordinate and ending time of a first segment may correspond to the starting coordinate and starting time of a next segment in the flight path. The aggregation of the coordinates and times for each of the segments for the flight path may be referred to as the 4D tube for flight path.

A UAV may adhere to its allocated 4D-tube to the extent possible, and if for some reason, the UAV is unable to do so (e.g., unidentified object on the way etc.), may inform the UTM of this scenario.

The UTM may recalculate the flight plan and update the UAV. The UTM may recalculate the flight plan and provide it to the UAV based on situational awareness reported by other UAVs in the region.

A UAV may comprise a WTRU. Mobility management may be provided. For example, RACH-less handover may be performed. Source eNB connection may be maintained during handover (e.g., make before break). For example, an explicit handover event may be triggered when the serving cell goes below a threshold, and the neighboring cell may become better than a threshold. In RACH-less handover, some of the functionalities that may be performed as a part of the RACH procedure may be done in advance due to synchronized eNBs.

The source and target eNBs may be synchronized, and at a mutually agreed time (e.g., system frame number (SFN) subframe boundary), a WTRU (e.g., a UAV) may switch from source to target cell without requiring random access procedures. The WTRU may calculate the timing advance (TA) difference between the source and target cell, while the WTRU is in the source cell. In order to achieve the TA of the target cell, the WTRU may first obtain the downlink (DL) propagation delay difference between the source cell and the target cell. The uplink (UL) propagation delay may or may not be the same as the DL propagation delay, depending on the propagation paths being used for UL versus DL.

In the 'make before break' solution, the Medium Access Control (MAC) and Packet Data Convergence Protocol (PDCP) reset at the source cell may not be performed until the WTRU does a successful RACH in the target cell. MAC and PDCP reset may be performed at the source cell the moment the HandOver command is received by WTRU, thereby suspending communication with the source eNB.

Flight management may be performed based on airspace resource availability, which may depend on dynamic geo-fencing, traffic scenarios, weather, etc. Flight management may be performed based on airspace and radio resource availability and requirements. Changes in radio resource availability may trigger changes in airspace resource availability and vice-versa, effecting the flight plan.

Figure 3:
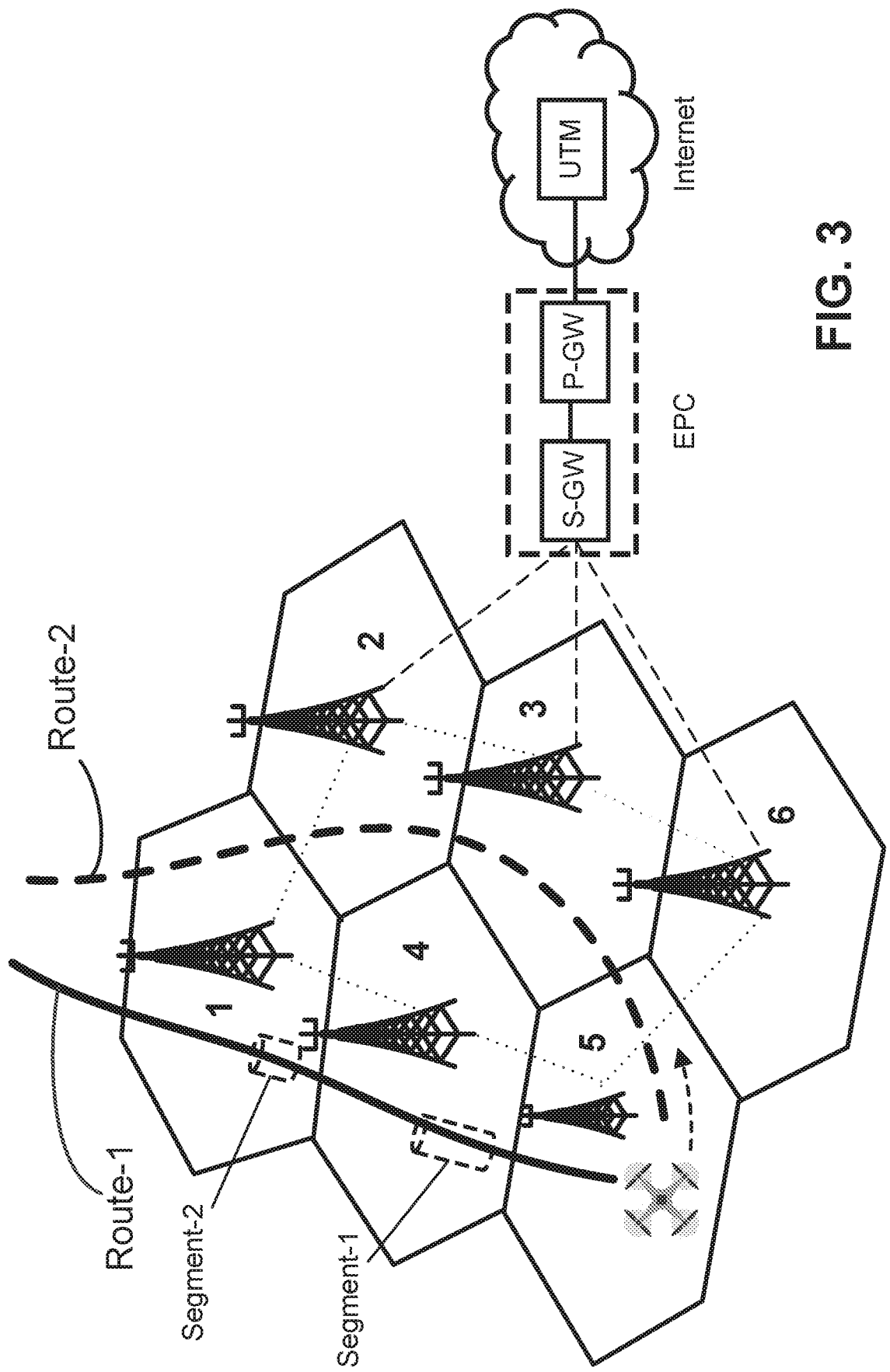
FIG. 3 is an example of joint radio and airspace resource management.

FIG. 3 is a simplified system view of example joint radio and airspace resource management. The radio resource requirements and radio resources availability for the flight path may be taken into account for providing guaranteed radio resources for command and control links for a UAV during the course of traversing its flight path.

The UAV may submit a flight plan request with its source and intended destination to the UTM in the cloud. Based on airspace constraints and traffic scenarios, the UTM may provide Route-1 traversing cell-5, cell-4 and cell-1 (e.g., as shown in FIG. 3) to the UAV along with its flight path GPS coordinates. Cell-4 may not be able to guarantee radio resources for a certain duration of time the UAV is in its coverage. Although Route-1 may not have any airspace constraints, Route-1 may have radio resource constraints, thereby impacting its reliability (e.g., using this route for command & control).

The UTM may communicate with the EPC/RAN to enable joint flight planning. Radio resources may be reallocated in the event of path change. Time-based block radio resource allocation may be performed for the flight mission. For example, time-based block radio resource allocation may refer to pre-allocating certain radio resources and/or otherwise preconfiguring the UAV/WTRU to utilize certain radio resources for a predetermined period of time. For example, a UAV traversing Route-1 in FIG. 3 may be pre-allocated radio resources in cell 4 or be otherwise receive a configuration to be implemented when communicating in Cell 4. The pre-allocated resources may correspond to Segment-1 of the flight path and may be associated with a corresponding start time and a corresponding end time. The WTRU may begin using the pre-allocated resources upon reaching the start time and may stop using the resources upon reaching the end time. Time-based preconfigured low-latency/lossless handover between cells may be performed, for example upon reaching time periods corresponding to a transition from one segment/cell in the flight path to another segment/cell in the flight path.

Figure 4:
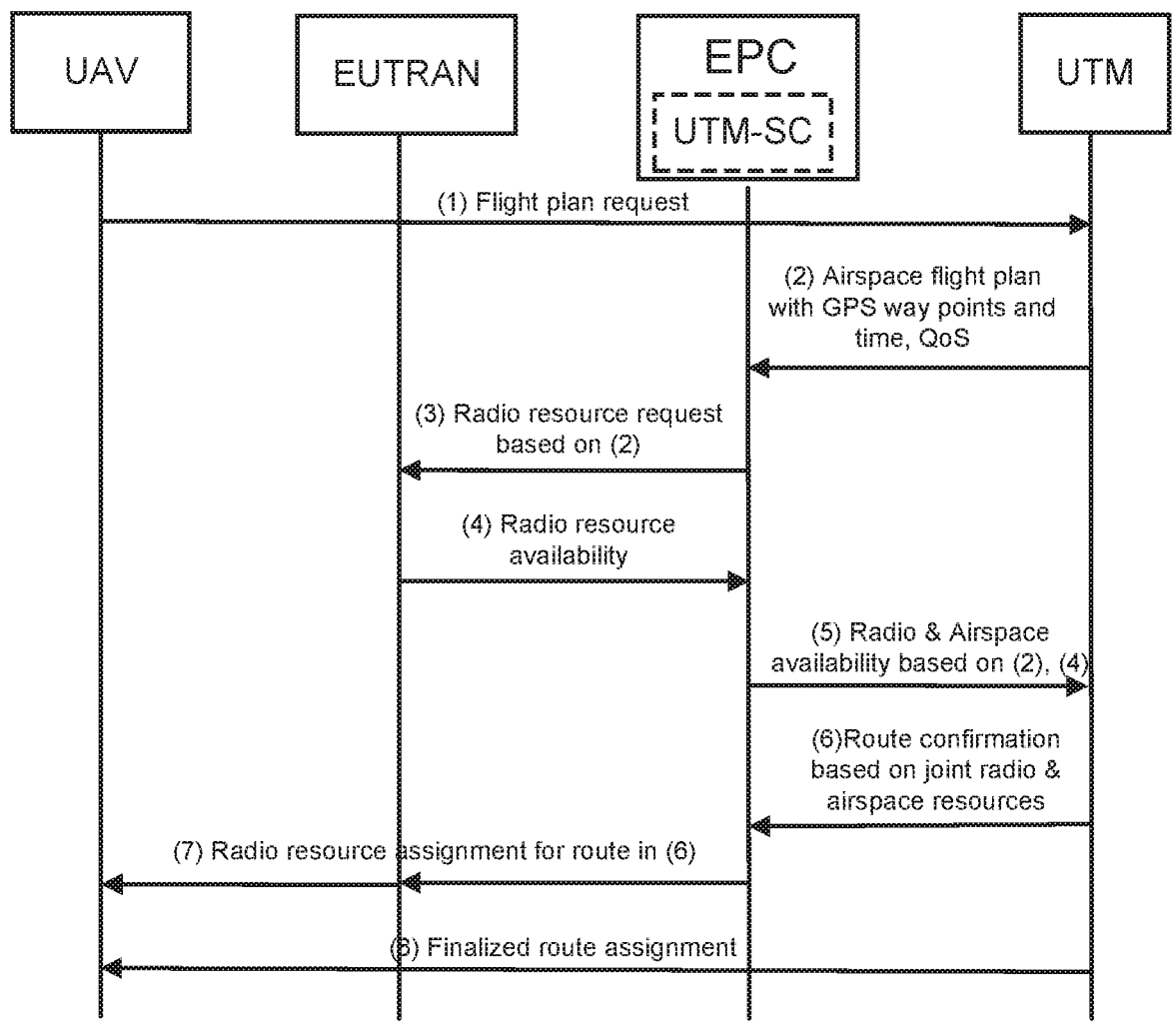
FIG. 4 is an example of joint radio and airspace resource management.

FIG. 4 illustrates example joint radio and airspace resource management. At (1) a flight plan request may be sent from the UAV to the UTM. As shown, at (2), the UTM may provide a number of possible routes that may take into account the airspace constraints that may include terrain, weather, no-fly zones, dynamic geo-fences and/or the like. The UTM may provide GPS way points and the time that the UAV may be expected to be traversing those way points. A route may include sequence of 4D-tube assignments (3D position, time) the UAV is expected to be occupying.

The UTM servicing center (UTM-SC) may be a logical entity which provides the functionality of interfacing between UTM and EPC. A UTM-SC may include (e.g. or refer to) an interworking function (IWF). The UTM-SC can be physically deployed as part of existing network elements in EPC such as P-GW, S-GW, MME, or any other IWFs. At (3), a radio resource request based on (2) is sent, and a radio resource availability received (4). Based on (2) and (4), the UTM determines a radio and airspace availability (5), and confirms a route based on joint radio and airspace resources. At (7), a radio resource may be assigned (e.g., reserved) for the route. At (8), the UTM sends the UAV the finalized route assignment. In an example, the radio resource may be assigned before the UAV travels, and may have a pre-planned time when it handovers to a new cell.

Figure 5:
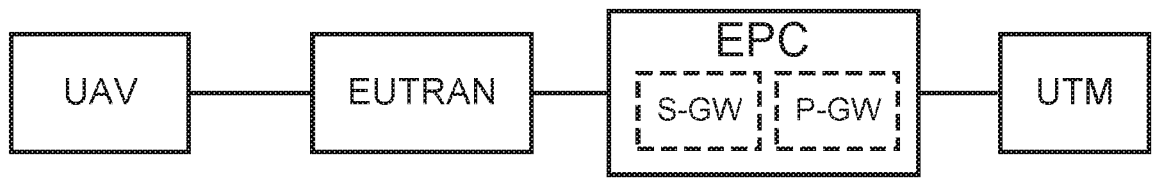
FIG. 5 is an example architecture for interfacing a UTM through a network element such as the Packet Data Network (PDN) Gateway (P-GW).

The UTM-SC may provide secure services for a UTM residing in the cloud. A UAV may interface with the UTM indirectly through the UTM-SC (e.g., may be referred to as the indirect architecture (in FIG. 4)). FIG. 5 illustrates an example architecture for interfacing with a UTM through P-GW. In the direct architecture, the UTM may interact with UAV through the P-GW.

Figure 6:
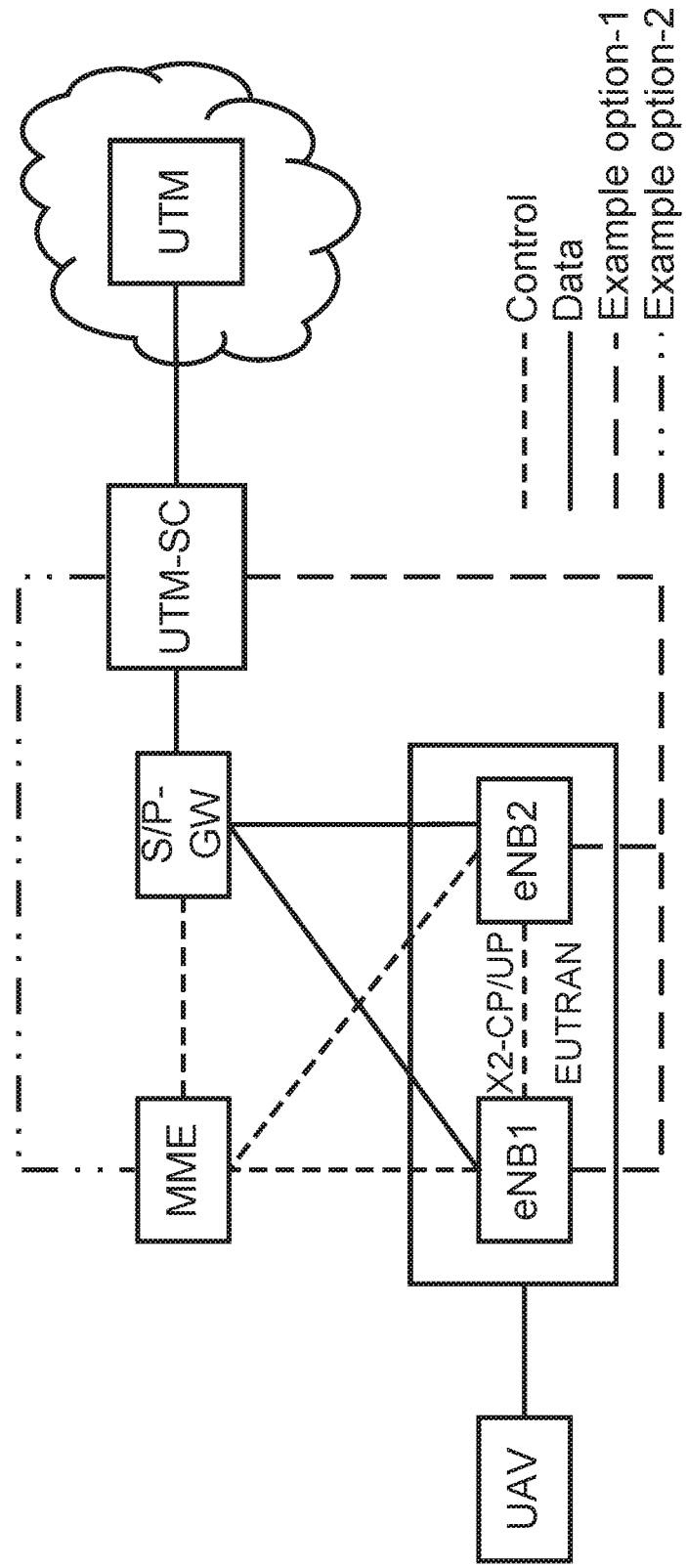
FIG. 6 is an example of an interaction between a UTM Servicing Center (UTM-SC) and an Evolved Universal Terrestrial Radio Access Network (E-UTRAN).

A UTM-SC may convert the 4D-tube flight assignment that may contain the GPS coordinates to cell-id (cell coverage area) equivalent. The UTM-SC may request radio resources and/or availability information from the eNB corresponding to the 4D-tube segment that the UAV may be expected to occupy for the time interval. When the 4D-tube spans multiple cells (or multiple sectors in a cell), the UTM-SC may divide into smaller independent 4D-tubes such that each smaller 4D-tube may span at most a sector/cell. The end-to-end 4D-tube may be divided into smaller segments-tubes where a segment-tube may span no longer than a sector (or cell), but may span lesser than a sector (cell). For a smaller 4D segment-tube, the UTM-SC may request radio resources from the appropriate eNB (e.g., segment-1, segment-2 shown in FIG. 3). The UTM-SC may provide parameters such as bandwidth requirements (and/or throughput), QoS, latency requirements, priority of the mission to the EUTRAN to seek resource availability. The UTM-SC may interact with the eNBs for requesting and/or receiving resource allocations. FIG. 6 illustrates example interaction of a UTM-SC with EUTRAN. For example, the UTM-SC may interact via example option 1 and/or through an MME (via example option 2) as shown in FIG. 6.

Radio resource availability for the requested time interval for segment(s) may be received by the UTM-SC from an eNB. The EUTRAN may provide resource availability (e.g., guaranteed and/or probabilistic) for a segment for the requested time interval. When assigning guaranteed resources, the EUTRAN may indicate one or more of the physical resource block (PRB) to be used for uplink and/or downlink, system information blocks (SIBs), C-Radio Network Temporary Identifier (RNTI), and/or the like. The reserved radio resources/configuration aspects may be communicated to the UAV via a RAN node (e.g., eNB, base station, gNB, etc.) via higher layer signaling (e.g., NAS signaling, RRC signaling) and/or at the application layer. When allocating probabilistic resources, the EUTRAN may provide the common resource pool that may be used while the UAV is using a segment. The probability of accessing the resource pool may be determined based on priority the network is assigning the UAV, priority of the mission the UAV requested etc., and back off parameters (if applicable) of the UAV. Based on the probability of resource allocation/access provided to the UTM-SC (by EUTRAN), the UTM may calculate the probability of resource allocation along a path and decide the path. For example, a path that maximizes the probability of radio resource allocation may be determined. As an example, let N be the number of paths that are free of airspace constraints, and let $a_i$ (i=1, . . . N) denote the number of segments in each potential path. The UTM may choose the path that may satisfy $$\operatorname*{argmax}_{a_i} \prod\nolimits_{k=1}^{a_i} p_k,$$

where $p_k$ may indicate the probability of radio resource allocation of a segment k.

A route may be chosen based on joint radio and airspace resource constraints. For example, an end-to-end path joint radio and resource allocation may include, but not be limited to, airspace resources and/or radio resources.

Airspace resources may include, but not be limited to, the number of segments, GPS coordinates of start and/or the end of each segment, some way points in between the start and end of a segment, the time interval the segment is allocated to the UAV, the absolute start time of the segment (e.g., in terms of GPS time, radio access network time (e.g., SFN and/or subframe number), other unambiguous timing information), the absolute end time of the segment (e.g., in terms of GPS time, radio access network time (e.g., SFN and/or subframe number), other unambiguous timing information), and/or the like. Radio resources may include, in case of guaranteed allocation, C-RNTI, uplink resources, downlink resources, etc. for the time interval the segment is occupied by the UAV. The resource information provided may be similar to what is provided in a dynamic and/or semipersistent grant or assignment (e.g., indication of PRBs, modulation and coding information, hybrid automatic repeat request (HARQ) information, and/or the like).

The resource reservations may be static and/or dynamic. In case of non-static resource allocations, the UAV can be scheduled different data blocks, which may make use of frequency dependent scheduling. For the uplink, the eNB may provide the hopping sequence that a UAV may use in sending the uplink data. The UAV may use different set of known resource blocks every Transmission Time Interval (TTI). The same may be done for downlink. In case of probabilistic radio resource allocation, the UAV may be provided the common resource pool for the segment(s), back off parameters for the segment(s) (if applicable).

A serving eNB may provide radio resource allocation and the time interval the resources are to be used for the entire flight mission (by cooperating with other eNB via the UTM-SC). For example, the UAV may be provided the configuration parameters for the set of segments (e.g., that may make the end-to-end path) upfront. For example, this may involve sending the C-RNTI, SIB, and/or resource block allocation applicable for target cells or segments that the UAV will pass through in future, before the start of the mission, or well before the UAV actually traverses the cell/segment. The radio resource allocation for the entire flight mission may be performed upfront. Radio resource information for other eNBs may be provided on a segment by segment basis, e.g., before the UAV exits a segment and transits to the next segment.

As an example, the outcome of (2) in FIG. 4 may include Route-1, and Route-2 as shown in FIG. 3. The UTM-SC may interpret Route-1 as one or more cell identifiers, time interval for the UAV to traverse the cell(s), and/or radio resource allocation that may requested for the cells. For example, the interpretation may include three cell-ids (or cell coverage areas), namely cell-5, cell-4 and cell-1, as shown in FIG. 3). The time interval the UAV traverses cell-5, cell-4 and cell-1 respectively may be interpreted to be $[a_5 \pm \tau, b_5 \pm \kappa]$, $[a_4 \pm \tau, b_4 \pm \kappa]$ and $[a_1 \pm \tau, b_1 \pm \kappa]$. Here $a_1$ denotes the time the UAV may enter cell-i, $b_1$ denotes the time the UAV may exit cell-i, and $\tau$, $\kappa$ denotes the maximum allowable jitter in the enter and exit times. For example, $\tau$, $\kappa$ may indicate the uncertainty in the entry and exit times of the UAV. For example, $\tau$, $\kappa$ may depend on the GPS accuracy, confidence parameter of situational awareness of the 4D segment-tube etc. For example, the interpretation may include radio resource allocation that may be requested for cell-5, cell-4 and cell-1 for the corresponding time interval. The number of radio resources (e.g., in PRBs) may be a function of throughput requested that may be provided by the UTM or UTM-SC. For example, at (2), the UTM may provide a QoS requirement, the list of possible routes, and the priority of the mission. There may be a standard definition of command and control bearer that may indicate a certain minimum level throughput requirement.

Similarly, Route-2 may be interpreted by the UTM-SC with cell-ids: cell-5, cell-3, cell-2 and cell-1 and time interval: $[a_5 \pm \tau, b_5 \pm \kappa]$, $[a_3 \pm \tau, b_3 \pm \kappa]$, $[a_2 \pm \tau, b_2 \pm \kappa]$ and $[a_1 \pm \tau, b_1 \pm \kappa]$ respectively. Suppose that for the time span $[a_4, b_4]$, cell-4 may be expected to be congested and cannot provide guaranteed resources for the UAV. Although both routes (e.g., Route-1 and Route-2) may be free of airspace constraints, the outcome of (6) in FIG. 4 may be chosen to be Route-2 (e.g., as it is free of both airspace and radio resource constraints).

For example, during the time interval $[a_4, b_4]$, due to emergency scenarios, if the 4D segment-tube becomes unavailable, the UAV may use its assigned resources to signal the UTM of the scenario. The UTM may find a local 4D-tube possibly in another sector on the same cellular coverage area. The same radio resource assigned to the UAV may be kept, provided the jitter caused due to airspace change is within the allowable jitter limits $(\tau, \kappa)$ described herein.

Radio resource management for airspace management (e.g., using 4D-tube segments) may extend to the geography based radio resource allocation.

Airspace or radio resources may be re-assigned. For example, there may be situations where the UAV may not be able to follow the path provided by the UTM due to unforeseen detect and avoid scenarios such as birds or other unknown flying objects, weather etc., and/or dynamic geofencing constraints etc. Change in UAV path may lead to uncertainties in availability of guaranteed airspace and/or radio resources. Radio resources may be reassigned. Airspace resource may be reassigned. Radio resources and airspace resources may be reassigned.

For example, a perturbance may be localized in the sense that it may involve changes to the local 4D-tubes being reassigned by the UTM, but still in the same cellular coverage area and without any change in the time interval $[t_1, t_2]$. The UAV may be in its cellular coverage area. Airspace resource may be reassigned, while maintaining the same radio resources.

For example, changes in local 4D-tubes may also lead to increase or decrease in time interval occupied by the UAV in the coverage area. For example, a UAV occupancy interval may change from $[t_1, t_2]$ in the actual flight plan to $[t_1, t_2+\delta]$ due to path change. Guaranteed radio resources may not be possible for the additional time, $\delta$.

Radio resource reassignment may be provided to provide guaranteed radio resources for the additional time $\delta$. For example, the eNB may signal a common resource pool that the UAV may use in case the UAV encounters a change in path. The common resource pool may be used by the UAVs in the coverage area that may be forced to change their flight path. The common resource pool may be a static resource block allocation signaled by the eNB that may be common to the UAVs in its coverage area. In an example, once the UAV changes the path, it may signal to the network using its current resource allocation (e.g., assuming that the time interval of the resource allocation has not expired) that it received at the beginning of the mission. Upon receiving this, the network may release current resource block allocation and reconfigure new resource blocks for the updated time interval (resulting from the path change) that the UAV may be occupying the modified 4D segment-tube. The access mechanism for the common resource pool may be based on a back off mechanism (e.g., dependent on priority of mission etc.). A UAV may transmit a scheduling request for resource grant similar to the conventional WTRUs. The UAV may decode the Physical Downlink Control Channel (PDCCH) to infer the downlink resource assignment.

The UAV may inform the network/UTM of the change in path. For example, (2) through (6) shown in FIG. 4 may be recomputed to obtain an updated flight plan.

Figure 7:
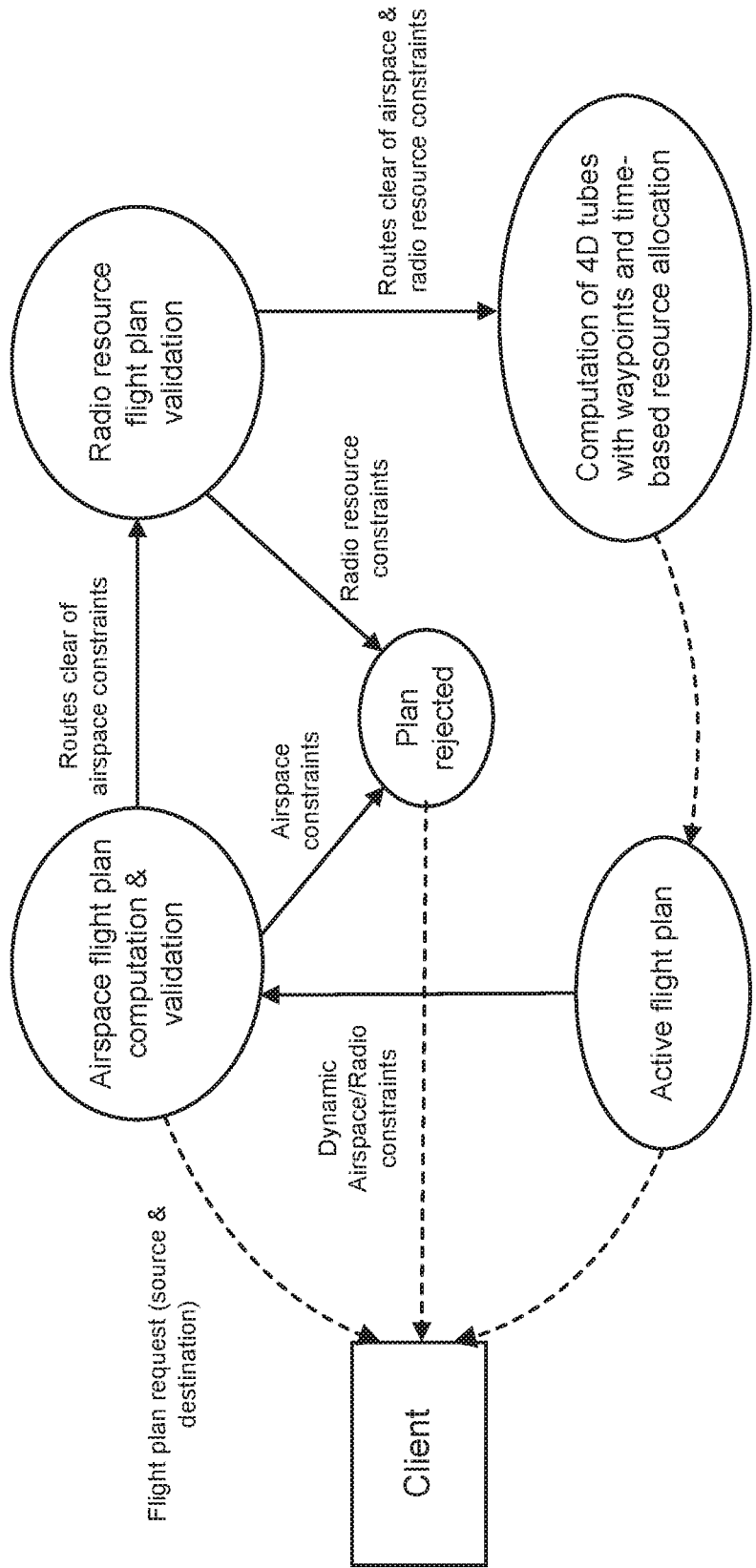
FIG. 7 is an example of joint airspace and radio resource allocation methodology with a dynamically changing radio and/or airspace resource.

FIG. 7 is state diagram showing joint airspace and radio resource allocation methodology with dynamically changing radio and/or airspace resource.

Off-nominal situations, such as whether a UAV is following its scheduled flight plan may be determined, based on UAV/network signaling.

Failure to attach notification may be used to detect off-normal situations. For example, the flight plan may provide details on the GPS way points, time interval the UAV may be attached to the particular cell, radio resources that are pre-allocated by the cell for the time interval the UAV is in its coverage area etc. Assume that a UAV is supposed to be attaching to the cell at time $t_1$ as per the flight plan. If by a time-window, e.g., $(t_1+\delta)$, where (may indicate some leeway), the UAV has not attached to the cell, the network can generate a notification to the UTM indicating of possible UAV path/plan change. Whether or not a UAV is attached to an eNB may be inferred based on whether the UAV transmits for instance 'Radio Resource Control (RRC) reconfig Complete' at the planned time when it handovers to a new cell (e.g., at time $t_1$) and at the worst case, the time is less than $(t_1+\delta)$. When the UAV has not attached within the $\delta$ leeway, the UAV may enter a recovery mode. For example, the UAV may transmit a scheduling request.

Network resource reconfiguration notification may be used to detect off-normal situations. Radio resources may be pre-allocated by the network at the beginning of a mission. Network performing resource reconfiguration for a UAV or the UAV requesting resources during the flight is an event that may indicate possible changes in flight plan. For example, network resource reconfiguration may be performed in the downlink by transmitting an unique sequence in the resource blocks that was allocated to the UAV (at the beginning of the mission). When the UAV decodes the unique sequence, it may infer that from the next TTI, the UAV may decode its PDCCH for inferring the downlink data assignments and the static block assignment (done at the beginning of the mission) may not be valid anymore. Frequent radio resource reconfigurations by the network for a UAV may indicate the inability of a network to provide guaranteed resource for the duration of the flight. An underlying UAS operator and/or application may use this statistic in choosing between multiple networks.

Radio congestion aware flight management may be performed. In probabilistic radio resources allocation, the flight route may be determined so as to increase (e.g., maximize) the probability of obtaining radio resources for the entire flight path. Depending on the congestion experienced (e.g., scheduling grant latency times, throughput supported during different times of day, days of the week etc.) by eNB (e.g., inferred from previous history), flight routes can be chosen.

Handover interruption time may be reduced (e.g., minimized). Handover between cells may be performed based on time, in addition to or instead of, being based on events such as the serving cell going below a threshold and neighboring cell being above a threshold. For example, the UAV may initiate a handover upon reaching a predetermined time, for example using resources or configurations corresponding to a next segment/cell in the flight path.

Configuration parameters for handover may be calculated upfront and provided to the UAV at the start of the mission. Timing advance (TA) may be calculated and provided to the WTRU for application at handover to the target cell. The GPS coordinates through which the UAVs traverse when they cross the cells may be determined based on the UAV flight plan. The TA may be calculated to be twice the propagation delay. The propagation delay at every point can be calculated from the distance between the eNBs and the UAV (e.g., obtained from the plan). Before the start of the mission, the serving eNBs may provide the TA experienced by the UAVs at all or selected way points in a 4D segment-tube or at those GPS coordinates the cell-changes/handover happen.

UAV-RNTI may be made constant for a particular UAV as it traverses through the cells (e.g., the UAV-RNTI may be common across cells). The RNTIs that will be used in the cells may be provided to the UAV upfront during the start of the mission. So at the appropriate time (e.g., when the UAV needs to be handing over to a cell), the UAV may start using the new RNTI. SIBs of other cells may be provided at the beginning of the mission.

A virtual cell concept may be used in a deterministic manner when servicing UAVs. As the path of the UAV and the time through which the UAV traverses an overlapping coverage area of multiple eNBs are known well in advance, the UAV may be assigned resources in such a way so as to use UL/DL resources of different eNBs (e.g., UAVs may use UL resource of eNB-1, and DL resources of eNB-2, while the UAV is in coverage of eNB-1, and eNB-2). This may enable the virtualization of eNBs to be performed during predetermined times when the UAVs are predicted to be in overlapping coverage areas. In another example, the virtualization of cells may be created from multiple transmission points geographically separated, yet connected to the same Cloud RAN.

Figure 8:
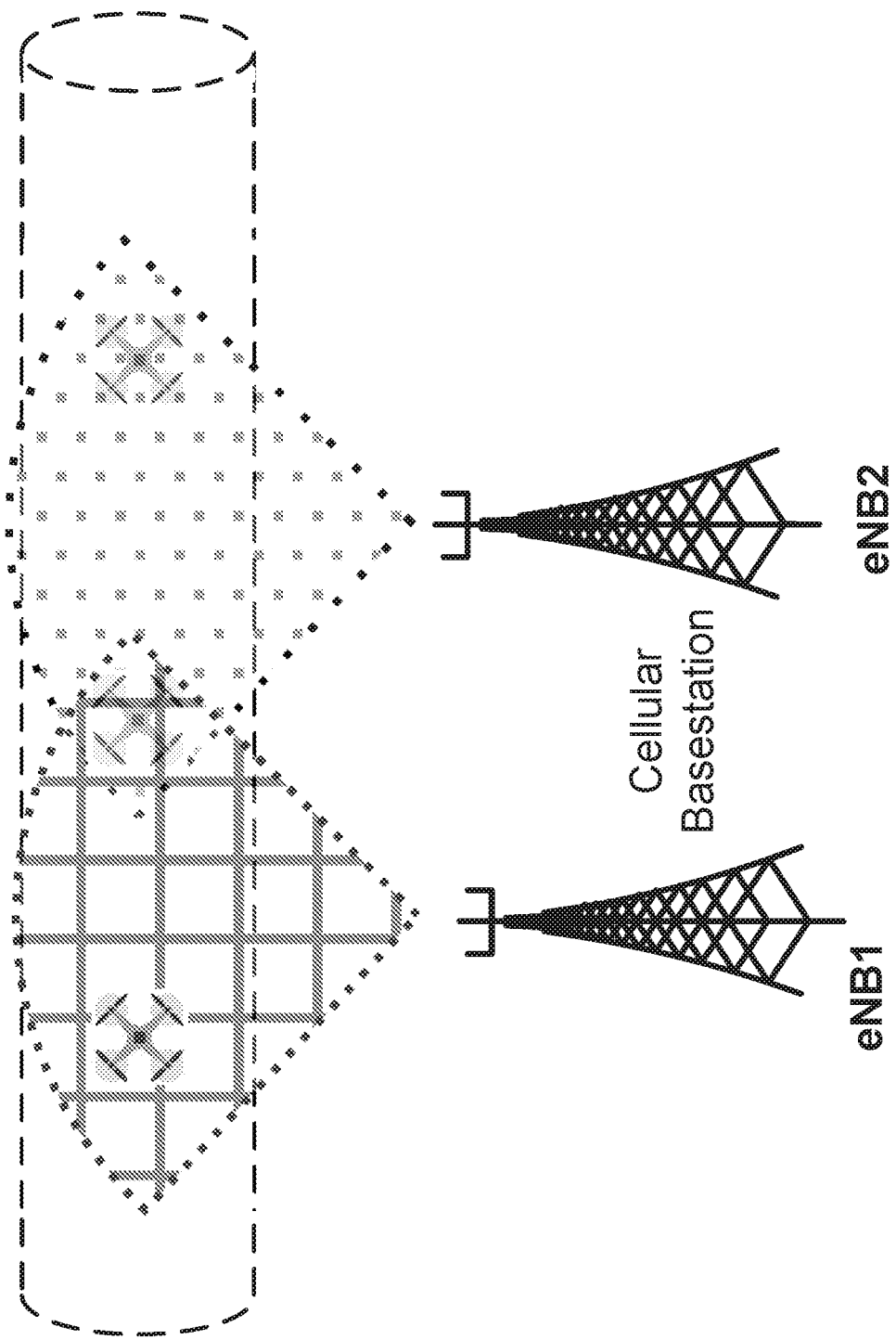
FIG. 8 an example of a time based handover between cells.

FIG. 8 shows an example handover. As shown, the UAV may hand over from eNB1 to eNB2. By joint radio and airspace resource assignment, let $[t_1, t_2]$, $[t_3, t_4]$ be the time interval during which the UAV is in the cellular coverage of eNB1, and eNB2 respectively. A UAV may be in coverage of both the cells during a time interval (A), and hence without loss of generality, let $t_3=t_2-\Delta$.

There may be pre-allocated radio resources both for the uplink and downlink during the time interval for each of the cells. Let $U_i$, $D_i$ (i=1,2) denote the uplink and downlink resources (in PRBs) allocated by cell-i. At time ($t_2-\epsilon$), the serving cell may provide assistance in the timing information that it may expect in the target cell (e.g., through X2 cooperation between the cells). The pre-calculated timing information may be received at the start of the mission. The UAV may use pre-calculated timing information along with the help that it may receive from the serving cell to refine the estimate.

Until time $t<t_2-\Delta$, the UAV may use the timing of source cell, and resources $U_1$, $D_1$. At time $t_2-\Delta$, the UAV may start using the timing of the target cell. The UAV may start using $U_2$, and may monitor both $D_1$, $D_2$. The UAV may keep monitoring $D_1$, $D_2$ until $t<t_2$, and may start monitoring only $D_2$ for $t \geq t_2$.

The methods described herein apply to RACH-less handovers. An implicit RRC Reconfiguration Complete may be performed. For example, the first time (at $t_3=t_2-\Delta$) the UAV may start using $U_2$ implicitly signifies 'RRC Reconfiguration Complete'.

A concept of time may be indicated or configured via SFN, CFN or any other form of local or global frame number, or as "n" number of sub-frames or frames from the current SFN/CFN or in absolute or differential time units.

Time based block resource allocation may be performed. An eNB may allocate the same set of PRBs for the duration $[t_1, t_2]$ for a UAV. For example, $[t_1, t_2]$ may denote the time the UAV is in a coverage of a cell. Here $t_1$ may represent the time the UAV enters the cell and $t_2$ represents the time the UAV exits the cell. Using the time based block resource allocation, the UAV may not need to perform scheduling request in the uplink during $[t_1, t_2]$. The UAV may not need to perform control channel decoding (e.g., PDCCH) to infer its data block allocation in the downlink, MCS allocation etc., for the said time duration $[t_1, t_2]$. Unlike in SPS where the UAV needs to continuously monitor the PDCCH, in the proposed time based block resource allocation scheme, a predetermined SFN/subframe or sets of SFN/subframe information may be provided to the UAV, for which the UAV may need to monitor the PDCCH, if the eNBs needs to update the resource block assignments/MCS. Accordingly, the eNB may signal the UAV of resource reassignment(s) only during the predetermined SFN/subframe time periods.

Handovers may be performed by UAV jointly based on measurement events and time. In an example, the eNB may configure the UAV to perform a handover to a target cell Tcell at a particular time instant '$t_2$' or during the time period $[t_2-\epsilon, t_2]$ (where $\epsilon>0$ denotes the hysteresis), provided Tcell is THR1 (denotes a threshold) better than the serving cell during the time $[t_2-\epsilon, t_2)$. The eNB may also configure the UAV to perform a handover to the target cell at time instant '$t_2$', if it meets the measurement criterion A5 (serving cell becoming less than an absolute threshold THR2, while target cell becoming better than THR3), at least during n>0 instances during the time period $[t_2-\epsilon, t_2)$.

In an example, the eNB may configure the UAV to perform a handover to a target cell Tcell, at a particular time instant '$t_2$' or during the time period $[t_2-\epsilon, t_2]$, if the following conditions are met: (i) all the detected cells by the UAV except Tcell is less than an absolute threshold THR5, or THR6 less than the serving cell, and (ii) Tcell greater than an absolute threshold THR8, or THR9 better than the serving cell. Let D denote the set of detected cells by the UAV. The UAV handovers to Tcell at '$t_2$', if all the cells in {D\Tcell} is less than THR5, and Tcell is THR9 better than the serving cell during $[t_2-\epsilon, t_2)$.

In a scheme that uses both the measurement events and the time to switch/handover from the serving cell to the target cell, the UAV may measure (e.g., only) the target cell that it was configured to switch, and may not take into account the other neighboring cells in the measurement process. In an example protocol to handover from a serving to a target cell: the UAV may determine that it is in a time window to begin the preparation to handover from a serving to target cell. The time window may be just before the configured time to actually handover to the target cell. The UAV determines whether (e.g., only) the target cell is above a threshold (or more generally satisfies a configured measurement event criterion), and does not take into account the other neighbors or compare with the serving cell in the measurement process. If the UAV determines to have satisfied the threshold/measurement event, it switches/handovers to the target cell at the configured time.

As long as the target cell is above a threshold, or the target cell satisfies a measurement event criterion, the handover to the target cell may be performed even if one or more of the following conditions may be experienced, in the configured time window: serving cell may better than the target cell when the handover is intended; and/or other neighboring cells may be better than the target cell in terms of received signal quality or loading levels etc. The measurement event criterion that the UAV checks in the configured time window prior to handover may be one or more of the following including a target cell being greater than an absolute threshold; a target cell not less than an offset away from the serving cell or other neighboring cells; a target cell greater than an absolute threshold for time T1, where T1 is less than the configured time window, and/or a target cell not less than an offset away from the serving cell or neighboring cells for time T2.

If the target cell to which the UAV needs to handover does not meet a threshold/measurement criterion in the configured time window, the UAV may choose another (e.g., best) neighboring cell it may have detected, or the UAV may choose to stay in the serving cell provided it satisfies the measurement criterion. The UAV may be provided a prioritized list of cells that it may need to consider, e.g., to perform handover in the configured time window. For example, the UAV may be provided a list of target cells: {R1, R2, . . . } to consider for handover in the time window. In the configured time window, the UAV may (e.g., first) attempt a handover to target cell R1, and may check whether the measurement/threshold criterion is satisfied. If R1 does not satisfy the measurement/threshold criterion, the UAV may attempt to check whether R2 satisfies the measurement/threshold criterion, and if so, the UAV performs handover to the target cell R2 at the configured time.

Although features and elements are described above in particular combinations, one of ordinary skill in the art will appreciate that each feature or element can be used alone or in any combination with the other features and elements. For example, principles described with respect to a travel path of a UAV may be equally applicable to a travel path of another type of autonomous vehicle. In an example, time-based handover may apply to autonomous vehicles.

In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

Although features and elements of the present specification may consider LTE, LTE-A, New Radio (NR), or 5G specific protocols, it is understood that the solutions described herein are not restricted to these scenario(s) and may be applicable to other wireless systems as well.

What is claimed:
1. A wireless transmit/receive unit (WTRU), comprising:
a processor configured to:
receive configuration information defining a dedicated radio resource assignment for a predetermined travel path, wherein the dedicated radio resource assignment comprises dedicated radio resources assigned to the WTRU for the predetermined travel path, a start time to use the dedicated radio resources assigned to the WTRU for the predetermined travel path, and an end time to stop use of the dedicated radio resources assigned to the WTRU for the predetermined travel path, wherein:
the predetermined travel path comprises a plurality of segments, and for each segment of the plurality of segments, the dedicated radio resource assignment comprises:
a respective dedicated radio resource,
a respective segment start time to use the respective dedicated radio resource, and
a respective segment end time to stop use of the respective dedicated radio resource, wherein the respective dedicated radio resource in each of the plurality of segments corresponds to a same resource block allocation for each of a plurality of cells associated with the plurality of segments;

determine that the respective segment start time has been reached and use the respective dedicated radio resource assigned to the WTRU for the segment of the predetermined travel path in a first cell based on reaching the respective segment start time; and determine that the respective segment end time has been reached and stop using the respective dedicated radio resource assigned to the WTRU for the segment of the predetermined travel path in the first cell based on reaching the respective segment end time.

2. The WTRU of claim 1, wherein the dedicated radio resource assignment further comprises a second set of dedicated radio resources assigned to the WTRU, a second start time to use the second set of dedicated radio resources, and a second end time to stop use of the second set of dedicated radio resources.

3. The WTRU of claim 2, wherein the processor is configured to determine the second start time has been reached and use the second set of dedicated radio resources in a second cell based on reaching the second start time, and determine the second end time has been reached and to stop use of the second set of dedicated radio resources in the second cell based on reaching the second end time.

4. The WTRU of claim 3, wherein the processor autonomously switches from the first cell to the second cell based upon reaching the second start time.

5. The WTRU of claim 1, wherein the configuration information indicates a C-Radio Network Temporary Identifier (C-RNTI), a system information block (SIB), and a resource block allocation for each cell within the predetermined travel path.

6. The WTRU of claim 1, wherein the processor is configured to fallback to a common resource pool if a failure condition is detected with respect to the dedicated radio resources, wherein the common resource pool is defined in the configuration information.

7. The WTRU of claim 1, wherein the processor is further configured to:
detect a change in the predetermined travel path, and
request reconfiguration information of the dedicated radio resources based on a change dectected in the predetermined travel path.

8. The WTRU of claim 1, wherein the configuration information includes a common preconfigured transmit resource pool allocation and back off time based on unmanned aerial vehicle (UAV) class/mission for prioritized pool access for uplink (UL) transmission.

9. A method, comprising:
receiving, at a WTRU, configuration information defining a dedicated radio resource assignment for a predetermined travel path, wherein the dedicated radio resource assignment comprises dedicated radio resources assigned to the WTRU for the predetermined travel path, a start time for using the dedicated radio resources assigned to the WTRU for the predetermined travel path, and an end time for using the dedicated radio resources assigned to the WTRU for the predetermined travel path, wherein:

the predetermined travel path comprises a plurality of segments, and for each segment of the plurality of segments, the dedicated radio resource assignment comprises:
a respective dedicated radio resource,
a respective segment start time for using the respective dedicated radio resource, and
a respective segment end time for stopping use of the respective dedicated radio resource, wherein the respective dedicated radio resource in each of the plurality of segments corresponds to a same resource block allocation for each of a plurality of cells associated with the plurality of segments;

determining, at the WTRU, that the respective segment start time has been reached and using the respective dedicated radio resource assigned to the WTRU for the segment of the predetermined travel path in a first cell based on reaching the respective segment start time; and determining, at the WTRU, that the respective segment end time has been reached and stop using the respective dedicated radio resource assigned to the WTRU for the segment of the predetermined travel path in the first cell based on reaching the respective segment end time.

10. The method of claim 9, wherein the dedicated radio resource assignment further comprises a second set of dedicated radio resources assigned to the WTRU, a second start time for using the second set of dedicated radio resources, and a second end time for stopping use of the second set of dedicated radio resources.

11. The method of claim 10, further comprising determining, at the WTRU, the second start time has been reached and using the second set of dedicated radio resources in a second cell based on reaching the second start time, and determining the second end time has been reached and stopping use of the second set of dedicated radio resources in the second cell based on reaching the second end time.

12. The method of claim 11, further comprising the WTRU autonomously switching from the first cell to the second cell based upon reaching the second start time.

13. The method of claim 9, wherein the configuration information indicates a C-RNTI, SIB, and a resource block allocation for each cell within the predetermined travel path.

14. The method of claim 9, wherein the WTRU is configured to fallback to a common resource pool if a failure condition is detected on the dedicated radio resources, wherein the common resource pool is defined in the configuration information.

15. The method of claim 9, further comprising:
detecting a change in the predetermined travel path, and
requesting reconfiguration information of the dedicated radio resources based on detecting a change in the predetermined travel path.

16. The method of claim 9, wherein the configuration information includes a common preconfigured transmit resource pool allocation and back off time based on UAV class/mission for prioritized pool access for UL transmission.

* * * * *